United States Patent Office 3,644,473
Patented Feb. 22, 1972

3,644,473
PRODUCTION OF ADIPONITRILE
Olav T. Onsager, Waldwick, N.J., assignor to
Halcon International, Inc.
No Drawing. Filed Feb. 24, 1969, Ser. No. 801,758
Int. Cl. C07c *121/26*
U.S. Cl. 260—465.8                                4 Claims

ABSTRACT OF THE DISCLOSURE

Process for the preparation of adiponitrile through the liquid phase reaction of 3-chloropropionitrile or 3-bromopropionitrile with a reducing agent such as a complex containing a transition metal and a Lewis base or a transition metal carbonyl and a Lewis base.

BACKGROUND OF THE INVENTION

This invention relates to a reductive dimerization of organic halides with a reductive coupling agent. More particularly, this invention relates to a reductive dimerization of non-allylic and non-benzylic type organic halides, with a metal complex (ligand).

The extension of carbon chains by the coupling of two groups is well-known in the art. Organic coupling has been accomplished for example by the well-known Wurtz reaction wherein an alkyl halide is acted upon with metallic sodium. Similarly, metal carbonyls have been employed in reductive dimerization (coupling) reactions of allylic type compounds. Metal carbonyls have also been employed in reactions of a variety of di-bromides as disclosed by F. F. Corey and Semmelback, Journal of American Chemical Society, vol. 89, pages 2755-2757 (1967). Similarly, metal carbonyls, as well as their complexes such as triphenylphosphinenickel tricarbonyl have been employed in the reactions of allylic di-halides to form cycloolefins. W. F. Beckhart and J. U. Lowe, Jr., in the Journal of Organic Chemistry, vol. 32, page 1215 (1967) have shown the dimerization of benzyl halides with metal carbonyl compounds. Similarly, I. D. Wurtz and G. T. Borchett, Journal of American Chemical Society, vol. 73, page 2664 (1951) have employed nickel carbonyl in a Wurtz type reaction of allylic halides. C. Eugene Coffey in the Journal of American Chemical Society, vol. 83, page 1687 (1961) has demonstrated that gem di-halides or 1,2-halides undergo coupling reactions with a metal carbonyl as well as substituted metal carbonyls such as pyridinetungsten tetracarbonyl.

In all of this prior art, the coupling reactions have been carried out with activated compounds, and at their activated cites, such as allylic halides, benzylic halides, gem di-halides and 1,2-dihalides. The art has therefore, demonstrated that metal carbonyls and their complexes are capable of reducing only with certain highly activated compounds. The art also teaches that non-activated compounds and in particular non-activated organic halides do not undergo these coupling reactions with these reductive coupling agents. This point is adequately demonstrated by C. Eugene Coffey, supra, wherein it is indicated that a non-activated mono halogen compound does not undergo a coupling reaction.

I have found, against this background, that although non-allylic and non-benzylic mono halogenated compounds do not undergo coupling reactions with a metal carbonyl as clearly demonstrated by the art, as well as by experiments carried out in my laboratory, these compounds do however surprisingly undergo coupling reactions with certain substituted metal carbonyls (complexes) and metal complexes.

THE INVENTION

My invention is therefore directed to the reductive dimerization of certain organic halides with (substituted) metal carbonyls or metal complexes (reducing agent) in the liquid phase with or without a solvent and at temperatures of 20–250°.

The compounds which are capable of undergoing this reductive dimerization are organic halogen compounds which are neither allylic, benzylic nor contain gem di-halides or more than one halide which are adjacent to one another (i.e., non-activated hydrocarbons), the halogen moiety of the organic compound may be either chlorine or bromine. The halogen may be on a primary or a secondary carbon atom. Preferably, the halogen is attached to a primary carbon atom. More specifically, these compounds may be paraffin (alkyl) or cycloparaffin (cycloalkyl). Included in the definition of the above compounds are substituted compounds wherein the substituents may be esters, (lower alkyl carboxylates), carboxylic acids, nitriles, nitro, halogen, hydroxides and amino. The paraffin halogen compounds of this invention may be a saturated lower aliphatic compound of from 2–6 carbons such as propyl chloride, propyl bromide, butylbromide, isobutylbromide, hexylchloride and the like. They may be substituted saturated lower aliphatic halides such as 3-chloropropionitrile, 3-bromopropionitrile, 4-chlorobutanol and the like. The aliphatic halides may also be saturated aliphatic halides containing from 7–12 carbon atoms such as 8-chlorooctanol, 2-chloroheptane and the like. The cycloparaffin compounds of this invention contain from 3–6 carbon atoms in the ring such as cyclopropyl bromide, cyclohexyl chloride and bromomethyl cyclohexane.

In the more preferred aspects of this invention, the starting organic halide compounds are lower saturated aliphatic halides of from 2–6 carbon atoms such as butyl bromide, n-propyl chloride and substituted saturated lower aliphatic halides such as 3-bromopropionitrile, 3-chloropropanol-1,3-bromopropionamide, 3 - chlorobutyric acid and ethylene bromohydrin.

The reducing agent employed in this invention is composed of a metal moiety and a ligand or a metal carbonyl moiety and a ligand. Suitable metals for these reducing agents are the transition metals of groups V–B, VI–B, VII–B, or VIII of the Periodic Table. In the preferred aspect of this invention, the metals are Cr, Fe, Co, Ni, Mn, Mo, W and especially Cr, Fe, Ni, Mn and Co. These metals may be present in the reducing agent in any valence state which is capable of being oxidized but preferably they are in the zero valence state. The ligand moiety of the reducing agent may be any Lewis base such as phosphines, phosphites, phosphorous halides, amines, pyridines, o-phenanthrolines, arsines and stibines.

The phosphines, arsines, stibines and phosphites may be suitably represented by the following general formulae:

R PH$_2$              (R)$_2$ PH            (R)$_2$P-P(R)$_2$
(R)$_3$ P             (R As H$_2$)          As(R)$_2$
(R)$_2$As H)          (R)$_3$ As
(RSb H$_2$ )          ( (R) Sb H)
(R)$_3$Sb             (HO)$_2$P(OR)
HOP(OR)$_2$    or     P(OR)$_3$

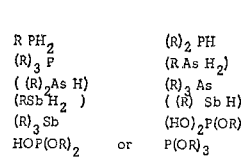 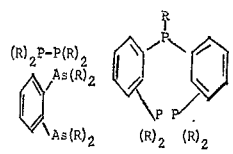

The various R groups may be the same or different in each ligand and may be an aliphatic, aromatic, ar-alkyl, alicyclic, phenoxy or phenylene group, both substituted and unsubstituted. The aliphatic group may be an alkyl from 1–12 carbon atoms such as methyl, ethyl, butyl, heptyl, decyl and the like and may be substituted with a group such as lower alkoxy, (methoxy, propoxy) hydroxy and cyano. Preferably, the aliphatic group is a lower alkyl group containing from 1–5 carbon atoms such as methyl, ethyl, butyl and the like. The aromatic group may be phenyl or a substituted phenyl such as methoxyphenyl, hydroxyphenyl, cyanophenyl and the like. The ar-alkyl group may be a benzyl, phenethyl, phenylpropyl and the like or substituted ar-alkyl groups containing the substituents as indicated above. The alicyclic group may be a cycloalkyl of from 3–6 carbons, such as cyclopropyl, cyclohexyl and the like or a substituted alicyclic such as with a lower alkyl, a lower alkoxy and the like. The phenoxy or phenylene group may be conveniently substituted with a cyano, hydroxy, lower alkoxy and the like.

The phosphorous halide reducing agent ligands may be shown by the following formulae:

wherein X may be bromine, chlorine or fluorine. The R group may be a phenyl lower alkyl group of from 1–6 carbon atoms or a cycloalkyl of from 3 to 12 carbon atoms on the ring. Representative examples of such phosphorous halides are as follows:

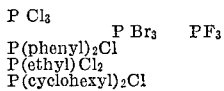

The amine ligands may be primary, secondary or tertiary amines of the general formula $R_1NH_2$, $(R_1)_2NH$, $(R_1)_3N$ wherein $R_1$ has the same definition as the R group for the phosphines etc. shown on col. 2 and especially lower alkyl of from 3–6 carbons such as propyl, pentyl and the like. The aliphatic substituents of both the secondary and tertiary amines may be the same or different. Representatives examples of the various amines are diethylamine, triethylamine, dipropylamine, isopropylamine, n-butylamine, tributylamine, diamylamine, 2-methyl-4-hexylamine, 2-ethylhexylamine, 1,1,3,3-tetramethylbutylamine and the like. The amines may also be alicyclic amines containing from 3–6 carbon atoms in the ring such as cyclopropylamine (cyclohexylmethyl)amine and the like. The amines may also be aromatic amines such as aniline and p-phenylene diamine.

The ligands may also be heterocyclic amines such as pyridine and o, m, or p-phenanthroline.

In the more preferred aspect of this invention the ligand moiety of the reducing agent contains a tri-valent phosphorous and an alkyl of from 1–8 carbon atoms, a substituted alkyl (from 1–8 carbons) a non-substituted cycloalkyl of from 3–6 carbon atoms, phenyl, a lower alkylidene(1–3 carbons), a mono di or tri lower alkyl, phenoxy, phenyl or phenylene and combinations of all of the above. The preferred metals are those indicated supra, and the reducing agent may or may not contain a carbonyl, but preferably does contain a carbonyl. Representative examples of the more preferred ligands of my invention, therefore, are:

P(ethyl)$_3$, P(n-octyl)$_3$, P(ethylcyano)$_3$, P(cyclohexyl)$_3$, P(phenyl)$_3$, P(phenyl)$_2$, Cl, P-[N-(butyl)$_2$]$_3$, P(O-phenyl)$_3$P(t-butyl)$_3$ (phenyl)$_2$P-(CH$_2$)$_2$-P(phenyl)$_2$ and (phenyl)$_2$P-(o-phenylene)-P(phenyl)$_2$ PCl$_3$, Sb(n-butyl)$_3$ or As(phenyl)$_3$.

Accordingly, representative examples of the reducing agents of this invention, as well as the more preferred reducing agents are as follows:

[P(phenyl)$_3$] Ni (CO)$_3$ [P(n-butyl)$_3$]$_2$ Ni (CO)$_2$,
[P(ethylcyano)$_3$]$_2$ Ni (CO), [P(ethylcyano)$_3$]$_3$ Ni (CO)
[P(N-(ethyl)$_2$)$_3$]$_2$ Ni (CO)$_2$, [PCl$_3$]$_4$ Ni, [PF$_3$]$_4$Ni,
[(phenyl)$_2$P-(CH$_2$)$_2$-P(phenyl)$_2$] Ni(CO)$_2$,
[P(phenyl)$_3$]$_2$ Ni (acrylonitrile)$_2$, [P(n-butyl)$_3$]$_2$ Ni (duroquinone)
[Ni(o-phenanthroline)$_3$] [Ni$_2$ (CO)$_6$], [Sb(n-butyl)$_3$]$_2$ Ni (CO)$_2$
[As(phenyl)$_3$]$_2$ Ni (CO)$_2$, [P(phenyl)$_3$]$_2$ Pt (CS$_2$)
([P(phenyl)$_3$] Co (CO)$_3$)$_2$, [P(phenyl)$_3$]$_2$ Ir. (CO) Cl,
[P(cyclohexyl)$_3$]$_2$ Fe (CO)$_3$, [P(ethyl)$_3$] Mn (CO)$_4$,
[P(phenyl)$_3$]$_2$ Cr (CO)$_4$, [o-phenylene bisdimethylarsine] Cr (CO)$_4$,
[P(phenyl)$_3$]$_2$ W (CO)$_4$ and [P(phenyl)$_3$]$_2$ V (CO)$_4$ In the process of my invention, the reaction can be conveniently carried out by reacting, at elevated temperatures and in the liquid state the appropriate organic halide with the appropriate reducing agent. The temperature of the reaction may vary from 20–250° C. but is preferably from 60–200° C. and especially from 100–180° C. The reaction pressure is not critical, the only requirement being that sufficient pressure be used, if necessary, in order to maintain the reaction in the liquid state. The reaction between the organic halide and the reducing agent theoretically requires 1 equivalent per mole of halide compound e.g. of the valence states of reducing agent are 0–2 at least 2 moles of halide per mole of reducing agent is desirable; if valence charger is e.g. 2 to 3 at least 1 mole of halide per mole of reducing agent, etc. In the more preferred aspects of my invention much higher ratios are desired or especially as much reducing agent is added to the organic halide as will dissolve. The reaction can be conveniently carried out in the presence of a solvent and for this purpose any inert solvent may be employed. Such solvents may be aromatic hydrocarbons such as benzene, ethers such as dioxane ether, tetrahydrofuran and the like. However, in the preferred method the solvent is the organic halide itself.

The reaction is also preferably carried out in the absence of oxygen and significant amounts of $H_2O$ and in the case wherein the "CO" moiety is part of the reducing agent an inert gas such as nitrogen or argon may be employed to purge CO from the system.

In another feature of my invention, it has been found that when from .01 to 10 moles of a precursor non-halogenated olefin (i.e., acrylonitrile when 3-halopropionitrile is used as a starting material) per mole organic halide is added to the reaction mixture, improved yields and selectivities are obtained.

As a particular feature and another aspect of my invention, the reaction is carried out on a continuous basis and the reducing agent is regenerated either in situ or in a separate vessel. Recovery of the reducing agent can be conveniently carried out in a number of ways such as direct reduction of the reacted reducing agent or ligand transfer reaction with the reacted reducing agent including the reuse of the metal or metal halide respectively. The overall reaction including the regeneration aspect of my invention may be demonstrated by the following formulae:

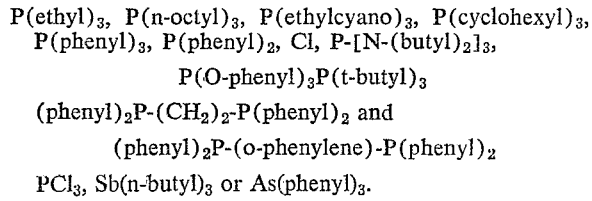

Suitably reaction A(2) is carried out by hydrogenation of the nickel halide in the presence of an inert solvent at elevated temperatures and pressures. Reaction A(3) may be carried out by any well known means for preparing metal carbonyls, such as the direct reaction between the metal and carbon monoxide at elevated temperatures and pressures, under a carbon monoxide atmosphere. Reaction (A4) which is the last step in the regeneration of the catalyst is a well known substitution reaction of metal carbonyls with appropriate ligands. The reaction can be suitably carried out by addition of the metal carbonyl to the ligand and heating the reaction mixture at elevated temperatures. The catalyst of this invention may also be recovered by the sequence of reaction as shown B(2)–(4). In reaction (2) the oxidized catalyst is regenerated in one step directly to the desired catalyst. In this reaction the oxidized catalyst is reacted with a metal carbonyl at elevated temperatures in the presence of an inert solvent and inert gas. The metal halide side product is conveniently reused in the reaction sequence as shown in reactions B(3) and (4). In reaction (3) the metal halide is reduced in an atmosphere of hydrogen at elevated temperatures. The metal thus formed is reacted with carbon monoxide B(4) as shown for A(3) above.

A particular feature of my invention is the ability to prepare my desired product including the regeneration of catalyst with little by-product waste. The above reaction sequence clearly demonstrates that the metal as well as ligand is suitably recycled into the system. The carbon monoxide by-product in several of the reactions can similarly be reused in any one or more of the other steps which employ carbon monoxide as a starting material. If it is desired, use of the hydrogen halide by-product as shown in reaction A(2) can also be used. For example, in the reaction of a 3-halo propionitrile to adiponitrile the starting 3-halo propionitrile may be prepared by the direct addiction of the hydrogen halide obtained from reaction A(2) to acrylonitrile. It can clearly be understood, therefore, that this particular feature of the invention relates to the reductive dimerization of organic halides with a catalyst which includes the total regeneration, if desired, of products formed.

The products prepared according to this invention may be used as solvents, or intermediates to form commercial products such as plastics, plastic fibers, detergents and dyes.

The following examples are given by way of illustration.

EXAMPLE 1

Preparation of adiponitrile 5.0 grs. P[(phenyl)$_3$]$_2$Ni(CO)$_2$ and 11.3 grs. 3-chloropropionitrile (substrate) are added to a 75 cc. stainless steel pressure vessel which has been evacuated to less than 1 mm. Hg and filled with nitrogen to atmospheric pressure. The reaction mixture is heated at 150° C. with agitation. After 1.5, 3.0 and 4.5 hrs. reaction time the reaction vessel is cooled to room temperature, connected to a gauge for pressure determination, vented, and a small sample drawn from the reaction mixture under nitrogen. The samples are analyzed by gas chromatography. The results are summarized in Table 1.

TABLE 1

| Reaction time, hrs.: | Pressure, p.s.i.g. | Coupled product |
|---|---|---|
| 1.5 | 30 | 0.05 gr. adiponitrile. |
| 3.0 | 40 | 0.10 gr. adiponitrile. |
| 4.5 | 40 | 0.20 gr. adiponitrile. |

In addition to adiponitrile, acrylonitrile and small amounts of propionitrile are also detected as reaction products. At the end of the reaction the adiponitrile is separated from the reaction mixture by fraction distillation. Similarly, when equivalent amounts of

[P(phenyl)$_3$] Ni (CO)$_3$, [P(n-butyl)$_3$]$_2$ Ni (C0)$_2$
[P(ethylcyano)$_3$]$_2$ Ni (CO)$_2$, [P(ethylcyano)$_3$]$_3$
  Ni (CO)
[P(N-(ethyl)$_2$)$_3$]$_2$ Ni (CO)$_2$ [PCl$_3$]$_4$ Ni, [PF$_3$]$_4$ Ni,
[(phenyl)$_2$ P-(CH$_2$)$_2$-P (phenyl)$_2$] Ni (CO)$_2$,
[P(phenyl)$_3$]$_2$ Ni (acrylonitrile)$_2$, [P-n-butyl)$_3$]$_2$
  Ni (duroquinone)
[Ni(o-phenanthroline)$_3$] [Ni$_2$ (CO)$_6$], [Sb(n-butyl)$_3$]$_2$
  Ni (CO)$_2$
[As(phenyl)$_3$]$_2$ Ni (CO)$_2$, [P(phenyl)$_3$]$_2$ Pt (CS$_2$)
([P(phenyl)$_3$] Co (CO)$_3$)$_2$, [P(phenyl)$_3$]$_2$ Ir. (CO) Cl,
[P(cyclohexyl)$_3$]$_2$ Fe (CO)$_3$, [P(ethyl)$_3$] Mn (CO)$_4$,
[P(phenyl)$_3$]$_2$ Cr (CO)$_4$, [o-phenylene bisdimethylarsine]
  Cr (CO)$_4$,
[P(phenyl)$_3$]$_2$ W (CO)$_4$ and [P(phenyl)$_3$]$_2$ V (CO)$_4$ are used in place of P[(phenyl)$_3$]$_2$ Ni(CO)$_2$ in the above example, similar results are obtained.

EXAMPLE 2

Preparation of adiponitrile 1.3 grs. [P(n-butyl)$_3$]$_2$Ni(CO)$_2$, 16.3 grs. 3-bromopropionitrile and 8.8 grs. benzene are added to a 100 cc. glass flask fitted with condenser and magnetic stirrer and heated to reflux (temperature 80° C.) for 1 hr. During this time a dark violet solution containing 0.125 gr. of adiponitrile (determined by lvp. gas chromatography) is obtained.

Similarly, when butylbromide, chloroacetic acid, 4-nitrobutylbromide, 4-chlorocyclohexanol, 3-bromopropylamine, methyl chloroacetate or 1,4-dichlorobutane is used in place of 3-bromopropionitrile in the above example and the temperature of reaction is 140° C. instead of 80° C., there is obtained octane, butanedioic acid, 1,8-dinitrooctane, bis p-hydroxy-cyclohexane, 1,6-diaminohexane, methyl butanedioic acid ester and 1,8-dichlorooctane respectively.

For Examples 3–13 the experimental procedure of Example 1 is used. The resluts of these experiments are summarized in Table 2.

TABLE 2

| Ex. | Reducing agent, (grs.) | Substrate (grs.) | | Temp., ° C. | Time, hrs. | Coupled prod. (grs.) | | By-products (grs.) | |
|---|---|---|---|---|---|---|---|---|---|
| 3 | [P(Ph)$_3$]Ni(CO)$_3$ (2.5) | 3-ClPrN | (11.3) | 150 | 9.0 | ADN | (0.05) | ACN, PrN | |
| 4 | Ni(CO)$_4$ (1.5) | 3-ClPrN | (11.3) | 150 | 16.0 | No | | | |
| 5 | [P(Ph)$_3$]$_2$Ni(CO)$_2$ (5.0) | 3-BrPrN | (32.6) | 140 | 16.0 | ADN | (0.450) | ACN, PrN | (0.800) |
| 6 | [P(Ph)$_3$]$_2$Ni(CO)$_2$ (5.0) | {3-BrPrN {ACN | {(32.6) {(1.6)} | 140 | 16.0 | ADN | (0.515) | ACN, PrN | (0.160) |
| 7 | [P(ethyl-CN)$_3$]$_2$Ni(CO)$_2$ (3.0) | 3-BrPrN | (16.3) | 50 | 20.0 | ADN a | | | |
| 8 | [P(Bu)$_3$]$_2$Ni(ACN)$_2$ (2.0) | 3-BrPrN | (16.3) | 120 | 5.0 | ADN a | | | |
| 9 | [P(cyclohexyl)$_3$]$_2$Cr(CO)$_4$ (3.0) | 3-ClPrN | (11.3) | 150 | 17.0 | ADN a | | | |
| 10 | [Ph$_2$P-(CH$_2$)$_2$-PPh$_2$]W(CO)$_4$ (1.0) | {3-ClPrN {ACN | {(11.3) {(0.8)} | 150 | 4.0 | ADN a | | | |
| 11 b | {[P(Ph)$_3$]Fe(CO)$_4$ {[P(Ph)$_3$]$_2$Fe(CO)$_3$} (2.0) | {3-ClPrN {ACN | {(11.3) {(0.8)} | 150 | 4.5 | ADN a | | | |
| 12 | [As(Ph)$_3$]$_2$Ni(CO)$_2$ (2.5) | 3-ClPrN | (11.3) | 150 | 8.0 | ADN a | | | |
| 13 | [2,2-bipyr]Ni(CO)$_2$ (2.5) | 3-BrPrN | (16.3) | 140 | 16.0 | ADN a | | | | a Qualitatively detected by lvp. gas chromatography.
b A mixture of mono- and disubstituted iron carbonyl was prepared according to A. F. Clifford, et al.—Inorg. Chem. 2 (No. 1), 152 (1963).

NOTE.—Ph=phenyl; PrN=propionitrile; ADN=adiponitrile; ACN=acrylonitrile; Bu=n-butyl.

EXAMPLE 14

Preparation of Ni 7.8 grs. [P(cyclohexyl)$_3$]$_2$ NiBr$_2$ and 200 ml. cyclohexane were charged to a high pressure vessel and reacted with hydrogen under a pressure of 1000 p.s.i.g. at 150° C. for 4 hrs. During this time the Ni-(II)-compound was reduced giving 0.5 gr. metallic nickel.

EXAMPLE 15

Preparation of [P$\phi_3$]$_2$Ni(CO)$_2$ (A) 27.0 grs. [$\phi_3$]$_2$ NiCl$_2$ and 5.4 ml. Ni (CO)$_4$ in 200 ml. 3-chloropropionitrile were reacted in a 1 l. flask fitted with condenser and magnetic stirring. The reaction was carried out under an atmosphere of argon and the temperature kept constant at 45 ± 2° C. by means of a water bath. The reaction mixture was stirred for 2 hrs. During this time the color turned from green to pale yellow and carbon monoxide evolution was observed. At the end of the reaction the temperature was raised to 55° C. for 0.5 hour. The warm mixture was vacuum-filtered. The yellow solid, NiCl$_2$, after washing with hot benzene and drying weighed 5.0 g. The filtrate and the wash benzene were combined and concentrated by evaporation to 100 ml. Addition of 500 ml. abs. ethanol to the remaining solution precipitated 25.0 grs. [P$\phi_3$]$_2$ Ni (CO)$_2$.

(B) 5.0 grs. NiCl$_2$ in 100 ml. water were charged to a Monel high pressure vessel and reduced with hydrogen at a temperature about 200° C. to give 2.1 grs. metallic nickel.

EXAMPLE 16

Preparation of [P(phenyl)$_3$]$_2$ Ni(CO)$_2$ 6.5 grs. triphenylphosphine dissolved in 60 ml. absolute ethanol were refluxed and stirred in a 100 ml. flask fitted with condenser, magnetic stirring and dropping funnel. From the funnel were added dropwise 1.6 ml. nickel carbonyl diluted with 10 m. absolute ethanol. After complete addition of the nickel carbonyl, the mixture was refluxed for 0.5 hour. During this time the evolution of carbon monoxide stopped. The reaction mixture was cooled and the [P(phenyl)$_3$]$_2$ Ni(CO)$_2$ allowed to crystallize from the solution giving 90% of the theoretical amount of desired product.

EXAMPLE 17

100 grs. [P(ethylcyano)$_3$]$_2$Ni(CO)$_2$ were reacted with 250 grs. 3-chloropropionitrile in a stainless steel pressure vessel fitted with stirring, condenser and a pressure regulator at 150° C. for 3.5 hrs. The pressure in the reaction vessel during this time was 30 p.s.i.g. Besides unreacted 3-chloropropionitrile some acrylonitrile and propionitrile, 14.0 grs. of adiponitrile were recovered from the reaction mixture by fractional distillation under reduced pressure. The distillation residue and 1.0 liter of water were charged to a high pressure reaction vessel and reacted with H$_2$ at 1000 p.s.i.g. at 200° C. for 4 hours. As the reduction product 8.5 grs. metallic nickel was obtained. The metallic nickel so obtained was reacted with carbon monoxide at 100° C. under a carbon monoxide pressure of 500 p.s.i.g. to give 13.0 ml. Ui(CO)$_4$ which was purified by distillation. By reacting the Ni(CO)$_4$ so formed with 40.0 grs. P(ethylcyano)$_3$ in 500 ml. refluxing ethanol 51.0 grs. of the reusable reducing agent,

[P(ethylcyano)$_3$]$_2$Ni(CO)$_2$ was formed, purified and recycled back to the reaction.

I claim:
1. A process for preparing adiponitrile which comprises reacting in the liquid state at 20 to 250° C. 3-chloropropionitrile or 3-bromopropionitrile with a reducing agent selected from the group consisting of a complex containing a transition metal and a Lewis base or a transition metal carbonyl and a Lewis base, the mol ratio of 3-chloropropionitrile or 3-bromopropionitrile to reducing agent being about at least 1:1.

2. The process of claim 1 wherein the reducing agent is selected from the group consisting of [P(phenyl)$_3$]Ni(CO)$_3$, [P(n - butyl)$_3$]$_2$Ni(CO)$_2$, [P(ethylcyano)$_3$]$_2$Ni(CO)$_2$, [P(ethylcyano)$_3$]$_3$Ni(CO), [P(N-(ethyl)$_2$)$_3$]$_2$Ni(CO)$_2$, [PCl$_3$]$_4$Ni,[PF$_3$]$_4$Ni, [(phenyl)$_2$P - (CH$_2$)$_2$-P(phenyl)$_2$]Ni(CO)$_2$, [P(phenyl)$_3$]$_2$Ni(acrylonitrile)$_2$, [P(n - butyl)$_3$]$_2$Ni(duroquinone), [Ni(o - phenanthroline)$_3$][Ni$_2$(CO)$_6$], [Sb(n-butyl)$_3$]$_2$Ni(CO)$_2$, [As(phenyl)$_3$]$_2$Ni(CO)$_2$,[P(phenyl)$_3$]$_2$Pt(CS$_2$), ([P(phenyl)$_3$]Co(CO)$_3$)$_2$, [P(phenyl)$_3$]$_2$Ir(CO)Cl, [P(cyclohexyl)$_3$]$_2$Fe(CO)$_3$, [P(ethyl)$_3$]$_3$Mn(CO)$_4$, [P(phenyl)$_3$]$_2$Cr(CO)$_4$, [o-phenylene bisdimethylarsine]Cr(CO)$_4$, [P(phenyl)$_3$]$_2$W(CO)$_4$ and [P-phenyl)$_3$]$_2$V(CO)$_4$.

3. The process of claim 1 wherein the temperature of reaction is between 60 and 200° C., the reducing agent is selected from the group consisting of [P(phenyl)$_3$]$_2$Ni(CO)$_2$, [P(n-butyl)$_3$]$_2$Ni(CO)$_2$ or [P(ethylcyano)$_3$]$_2$Ni(CO)$_2$ and the mole ratio of said 3-chloropropionitrile or 3-bromopropionitrile to reducing agent is at least 2:1.

4. A process for preparing adiponitrile which comprises reacting in the liquid state 3-chloropropionitrile or 3-bromopropionitrile at a temperature of 100 to 180° C. with a reducing agent selected from the group consisting of [P(phenyl)$_3$]Ni(CO)$_2$, [P(n-butyl)$_3$]$_2$Ni(CO)$_2$ or [P(ethylcyano)$_3$]$_2$Ni(CO)$_2$ the mol ratio of said 3-chloropropionitrile or 3-bromopropionitrile to said reducing agent is at least 2:1 and in admixture with from 0.1 to 10 moles of acrylonitrile per mole of 3-chloropropionitrile or 3-bromopropionitrile.

References Cited

UNITED STATES PATENTS 2,606,204  8/1952  Hogsed et al. _____ 260—465.8

JOSEPH PAUL BRUST, Primary Examiner

U.S. Cl. X.R.

260—464, 465.1, 465.9, 468, 485, 514, 537, 563, 583, 631, 635, 644, 648, 652